Oct. 17, 1944.   F. R. EDDY ET AL   2,360,661
DISCHARGE TABLE
Filed July 10, 1943   3 Sheets-Sheet 2
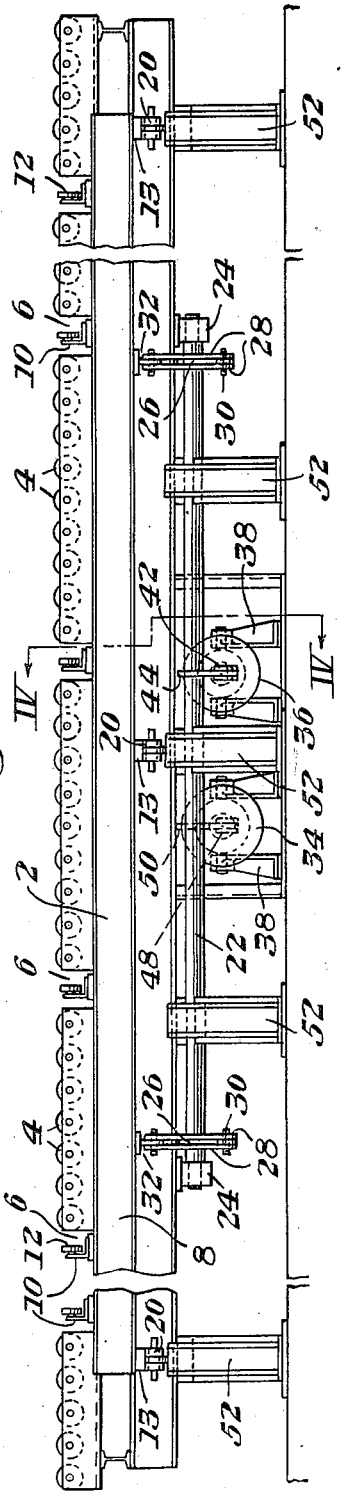
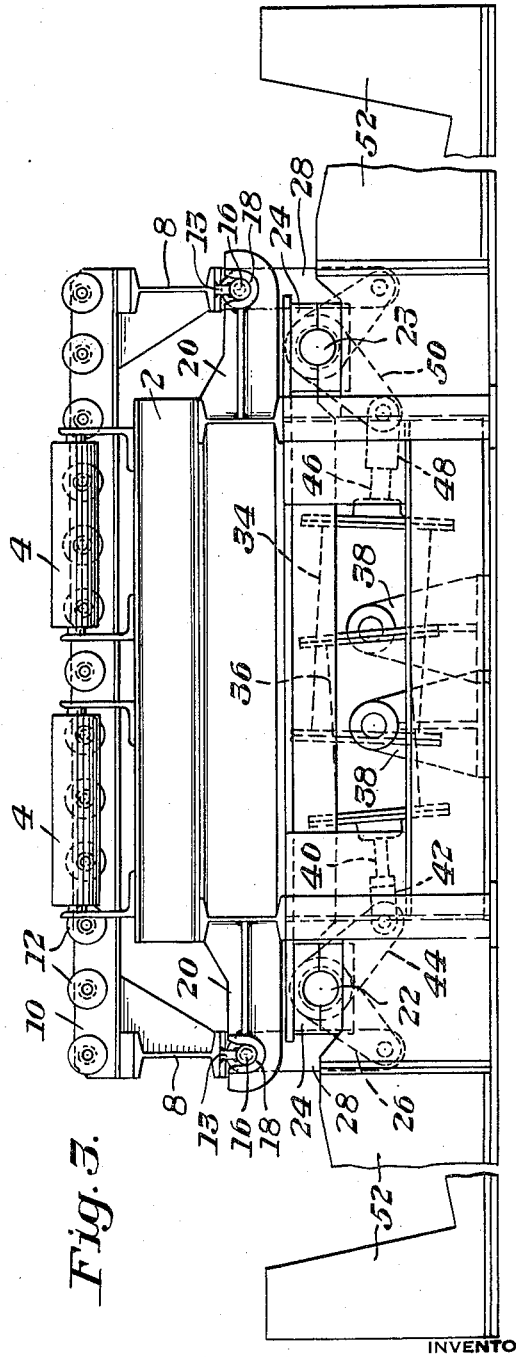
INVENTORS
FORREST R. EDDY and
RUSSELL D. HUFFINGTON,
by: John E. Jackson
their Attorney.

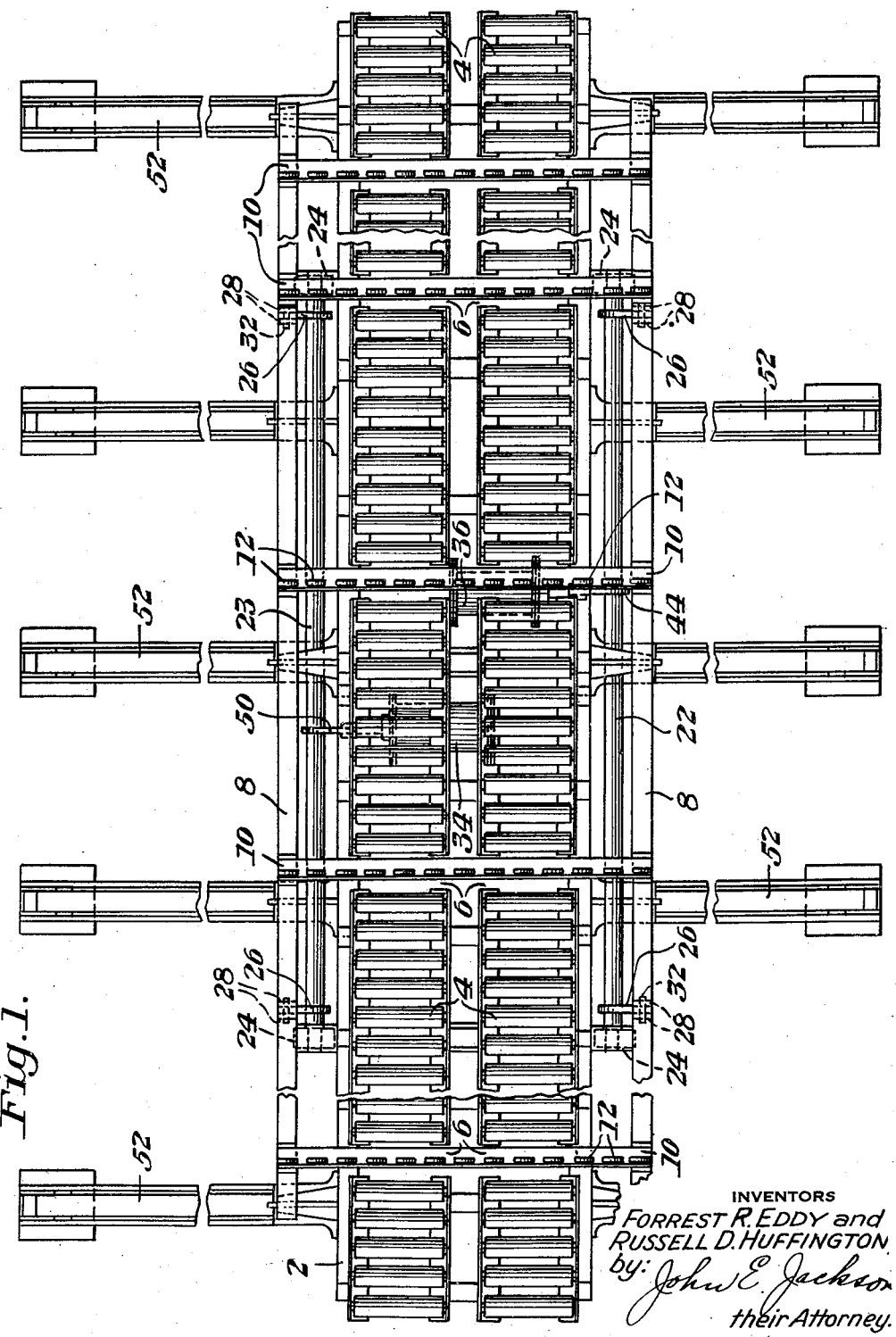

INVENTORS
FORREST R. EDDY and
RUSSELL D. HUFFINGTON,
by John E. Jackson
their Attorney.

Patented Oct. 17, 1944

2,360,661

UNITED STATES PATENT OFFICE 2,360,661

DISCHARGE TABLE

Forrest R. Eddy and Russell D. Huffington, Gary, Ind., assignors to Carnegie-Illinois Steel Corporation, a corporation of New Jersey Application July 10, 1943, Serial No. 494,258

6 Claims. (Cl. 193—36)

This invention relates to a discharge table for discharging elongated articles from a roller conveyor. In discharging elongated articles, especially heavy articles such as plate from a roller conveyor, the common practice is to shove the plate off the conveyor to either side. When the plates are coming from a shear, they must be removed promptly to provide uninterrupted operation of the shear, which is not always possible with manual removal.

It is an object of this invention to provide mechanical means for discharging plates from a conveyor.

This and other objects will be more apparent after referring to the following specification and attached drawings, in which:

Figure 1 is a plan view of the discharge table and its associated conveyor;

Figure 2 is a side elevation;

Figure 3 is an end view;

Figure 5:
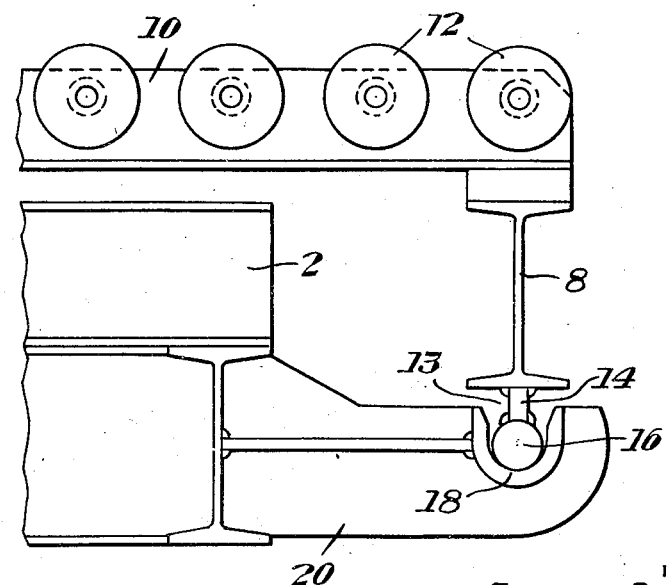
Figure 5 shows a detail of the invention.

Referring more particularly to the drawings, the reference numeral 2 indicates a fixed roller table having a plurality of conveyor rollers 4 mounted thereon. These rollers are arranged in groups with transverse openings 6 therebetween. On each side of the conveyor table 2 is a longitudinal I-beam 8 which are connected by a plurality of transverse members 10 located in the openings 6. Mounted on the transverse members 10 are a plurality of transverse rollers 12, the top of the rollers normally being below the top of conveyor rollers 4. The I-beams 8 and transverse members 10 are welded or otherwise fastened together to form a rigid table. As best shown in Figure 2, each I-beam 8 has three extension legs 13 fastened thereto in spaced apart relationship. As shown in Figure 5, each extension leg consists of a bar 14 welded to the beam 8 and a rod 16 welded to the bar 14. These rods rest in bearings 18 on brackets 20 which are welded to roller table 2. Between the I-beams 8 and roller table 2 are shafts 22 and 23 mounted for rotation in bearings 24. Fixedly mounted on the shaft 22 adjacent the ends thereof are levers 26 to each of which are attached a pair of links 28 by means of pin 30. The upper ends of the links 28 are fastened to the I-beams 8 by means of hinges 32. Beneath the table 2, near the center thereof, are a pair of air cylinders 34 and 36, which are pivotally mounted on brackets 38. Piston rod 40 carries a clevis 42 which is attached to a lever 44 fixedly mounted on shaft 22. Piston rod 46 carries a clevis 48 which is attached to a lever 50 fixedly mounted on shaft 23. On either side of roller table 2 are skids 52.

Figure 4:
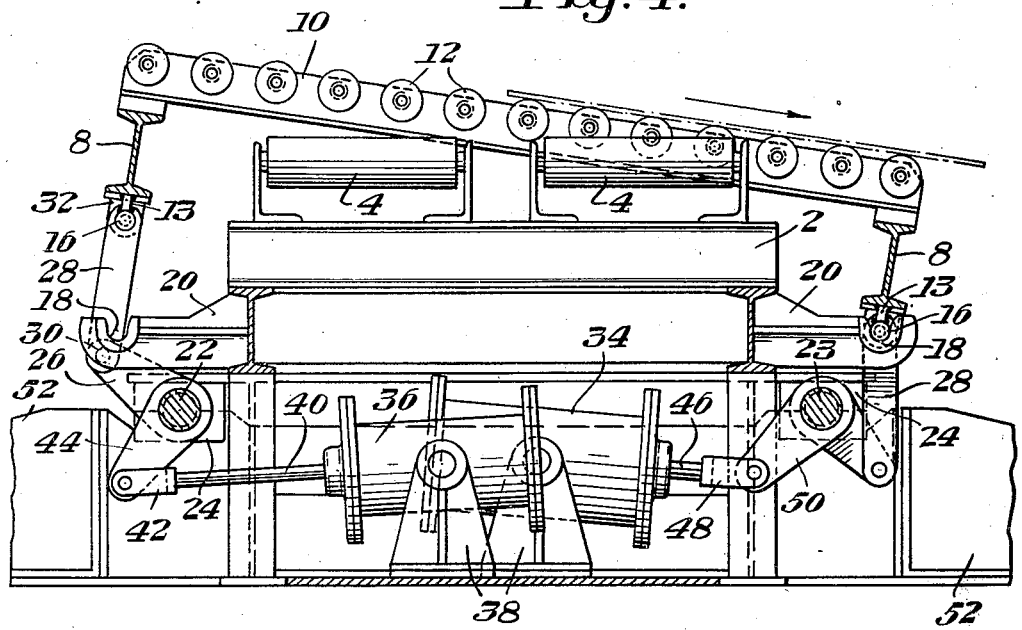
Figure 4 is a cross-sectional view taken on line IV—IV of Figure 2 and showing the discharge table in elevated position.

The operation of the device is as follows:

Normally the discharge table is in the position shown in Figure 3 with the rods 16 resting in bearings 18. When a plate coming from a shear or other processing means is to be discharged into the skids 52 on the right hand side of the conveyor, as seen in Figure 3, air is admitted to the right hand side of the cylinder 36. This moves piston rod 46 outwardly, thus rotating the lever 44 and shaft 22 in a clockwise direction. This causes the left hand end of the discharge table to be lifted from the bearings 18 by means of levers 26 and links 28, the table pivoting on the bearings 18 on the right hand side of the table. In this position, as shown in Figure 4, the rollers 12 rise above the conveyor rollers 4 causing the plate to slide by gravity along the rollers 12 and come to rest in the skids 52. To discharge a plate to the left, air is admitted to the left of cylinder 34 and the right hand end is elevated in a similar manner. After a plate is discharged from the conveyor, air is admitted to the outer end of the cylinder to return the table to the position shown in Figure 3.

While one embodiment of the invention has been shown and described, it will be more apparent to one skilled in the art, that other adaptations and modifications may be made without departing from the scope of the following claims.

We claim:

1. A table for discharging an article from a roller conveyor having a plurality of transverse openings therein comprising a longitudinal member on each side of the conveyor, means located in said openings for connecting said members, a plurality of transverse rollers supported by said means, the top of said last named rollers normally being below the top of the conveyor rollers, each of said members being pivotally mounted and movable with respect to said conveyor, and means for selectively moving each of said members about the pivot of the other member to raise said transverse rollers above said conveyor rollers and discharge said article from said conveyor.

2. A table for discharging an article from a roller conveyor having a plurality of transverse openings therein comprising a longitudinal member on each side of the conveyor, means located in said openings for connecting said members, a plurality of transverse rollers supported by said means, the top of said last named rollers normally being below the top of the conveyor rollers, each of said members being pivotally mounted and movable with respect to said conveyor, a link connected to each end of said movable members, a bell crank lever connected to each of said links, and means for selectively actuating the bell crank levers at one side of the conveyor to move the members connected thereto about their opposite pivots to raise said transverse rollers above said conveyor rollers and discharge said article from said conveyor.

3. A table for discharging an article from a roller conveyor having a plurality of transverse openings therein comprising a longitudinal member on each side of the conveyor, means located in said openings for connecting said members, a plurality of transverse rollers supported by said means, the top of said last named rollers normally being below the top of the conveyor rollers, a plurality of supports for each of said members, and means for selectively moving each of said members about the supports for the other of said members to raise said transverse rollers above said conveyor rollers and discharge said article from said conveyor.

4. A table for discharging an article from a roller conveyor having a plurality of transverse openings therein comprising a longtiudinal member on each side of said conveyor, means located in said openings for connecting the members, a plurality of transverse rollers supported by said means, the top of said last named rollers normally being below the top of the conveyor rollers, a plurality of supports for each of said members, at least one link connected to each of said members, a longitudinal shaft adjacent each of said members, a lever connecting each of said links to one of said shafts, and means for selectively rotating one of said shafts to move the adjacent member about the supports for the other of said members to raise said transverse rollers above said conveyor rollers and discharge said article from said conveyor.

5. A table for discharging an article from a roller conveyor having a plurality of transverse openings therein comprising a longitudinal member on each side of said conveyor, means located in said openings for connecting the members, a plurality of transverse rollers supported by said means, the top of said last named rollers normally being below the top of the conveyor rollers, a plurality of supports for each of said members, at least one link connected to each of said members, a longitudinal shaft adjacent each of said members, a lever connecting each of said links to one of said shafts, a second lever connected to each of said shafts, and a pivotally mounted cylinder connected to each of said second levers, said cylinders being adapted to be selectively actuated to rotate the shaft adjacent thereto to move the adjacent member about the supports for the other of said members to raise said transverse rollers above said conveyor rollers and discharge said article from said conveyor.

6. A table for discharging an article from a roller conveyor having a plurality of transverse openings therein comprising a transverse member in each of said openings, a plurality of transverse rollers supported by each of said members, the top of said last named rollers normally being below the top of the conveyor rollers, each of said members being pivotally mounted at their ends, and means for selectively moving said members in unison about the pivots at one side of the conveyor to raise said transverse rollers above said conveyor rollers and discharge said article from said conveyor.

FORREST R. EDDY.
RUSSELL D. HUFFINGTON.